Feb. 9, 1926.

C. R. GILLIS

PISTON RING COMPRESSOR

Filed Dec. 12, 1923

1,572,135

Inventor.
Charles R. Gillis
by his att'y

Patented Feb. 9, 1926.

1,572,135

UNITED STATES PATENT OFFICE.

CHARLES R. GILLIS, OF BOSTON, MASSACHUSETTS, ASSIGNOR OF ONE-HALF TO GEORGE F. TAFT AND ONE-HALF TO NORMAN S. WAITE, BOTH OF BOSTON, MASSACHUSETTS.

PISTON-RING COMPRESSOR.

Application filed December 12, 1923. Serial No. 680,243.

*To all whom it may concern:*

Be it known that I, CHARLES R. GILLIS, a citizen of the United States, residing at Boston, in the county of Suffolk and State of Massachusetts, have invented new and useful Improvements in Piston-Ring Compressors, of which the following is a specification.

This invention relates to a piston ring compressor and has for its object to provide a simple, inexpensive device for embracing a piston and for confining the piston rings thereof entirely within their respective grooves in said piston, while the latter is being inserted in its cylinder and thereby enabling mechanics, automobile owners and particularly unskilled persons to quickly and easily perform the assembling operation without danger of injury either to the cylinder or to the piston rings.

Another object of the invention is to provide a device which can be easily adjusted to fit different sizes of pistons and particularly the various sizes usually employed in internal combustion engines.

The device is particularly adapted for use upon pistons which necessarily must have their piston rings placed thereon before the piston is inserted within its cylinder, and where the piston with its connecting rod attached thereto must be inserted into the cylinder through the lower end thereof as is the case in most forms of internal combustion engines.

The invention consists in the combination and arrangement of parts set forth in the following specification and particularly as pointed out in the claims.

Referring to the drawings.

Like numerals refer to like parts throughout the several views of the drawings.

Figures 1, 2, 4:
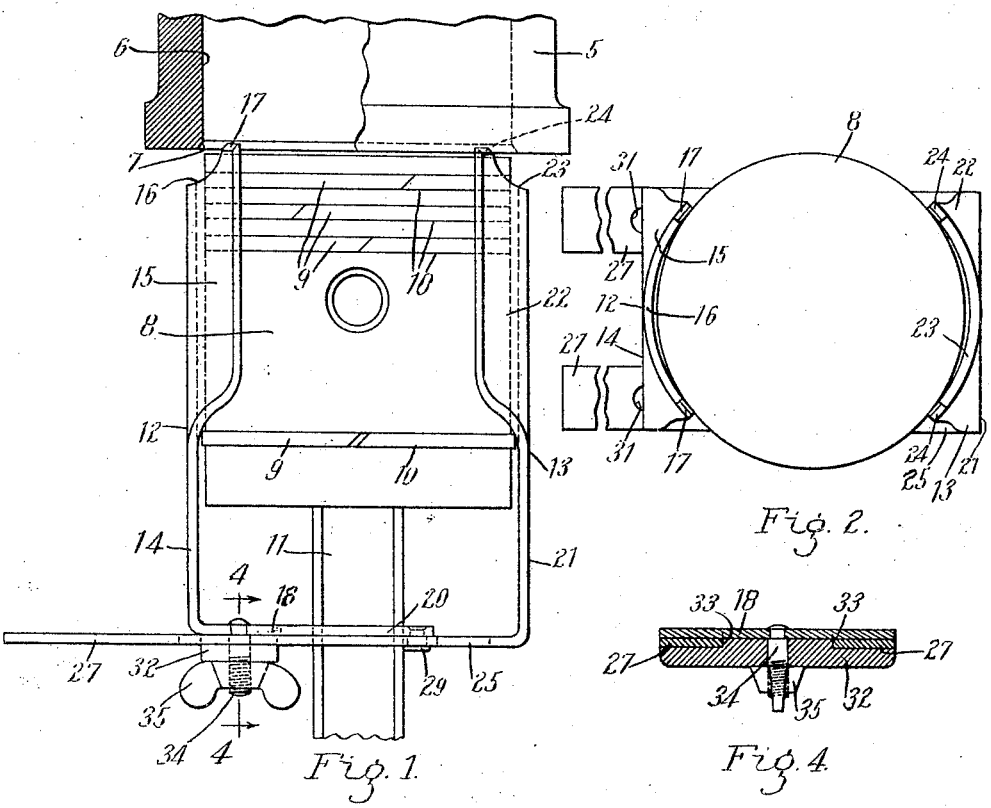
Figure 1 represents a side elevation of a piston having my improved piston ring compressor positioned thereon, a portion of a cylinder into which the piston is to be inserted also being illustrated in connection therewith.
Fig. 2 is a plan view of a piston with the piston ring compressor in position thereon.
Fig. 4 is a detail transverse section taken on the line 4—4 of Fig. 1.
Figure 3:
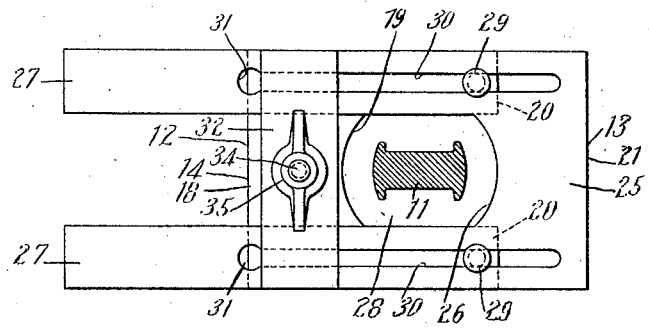
Fig. 3 is an underneath plan view of the piston ring compressor.

In the drawings, 5 represents a portion of a cylinder of any suitable design and constructed for any suitable purpose and said cylinder is provided with a cylindrical bore 6, the lower end of which is bevelled slightly at 7. 8 represents a piston also of any suitable construction and adapted to fit the bore 6 of the cylinder 5 and reciprocate therein in the usual well known manner. The piston 8 is provided with a plurality of piston rings 9 of well known construction, said rings being located in annular grooves 10 provided in the periphery of said piston. The piston 8 is provided with the usual connecting rod 11 attached thereto.

The piston ring compressor comprising this invention embodies therein two oppositely disposed members 12 and 13 of somewhat similar construction and preferably constructed of suitable sheet material. The member 12 embodies therein a flat, intermediate portion 14 at the upper end of which is a slightly resilient curved portion 15, the upper extremity of which is bifurcated at 16 and provided with furcations 17. The upper extremities of the furcations 17 are bevelled slightly to engage the bevelled portion 7 of the cylinder 5. The lower portion of the member 12 is bent at 18 and extends at an angle of 90° to the intermediate portion 14 thereof, and said bent portion is forked at 19, thereby forming furcations 20.

The member 13 embodies therein a flat intermediate portion 21 at the upper end of which is a slightly resilient curved portion 22, the upper extremity of which is bifurcated at 23 and provided with furcations 24. The upper extremities of the furcations 24 are bevelled slightly to engage the bevelled portion 7 of the cylinder 5. The lower portion of the member 12 is bent at 25 and extends at an angle of 90° to the intermediate portion 21 thereof, and said bent portion is forked at 26 thereby forming furcations 27.

The lower portion 18 of the member 12 has sliding engagement with the lower portion 25 of the member 13 and the forked portion 19 of said member 12 extends in an opposite direction to the forked portion 26 of the member 13 and an opening 28 is thereby formed between said forked portions 19 and 26 through which the connecting rod 11 of the piston 8 extends when the compressor is attached to said piston as illustrated in Fig. 1.

The members 12 and 13 are held in sliding interlocking engagement one with the other through the medium of a pair of studs 29 which are rigidly secured in the portion 18 of the member 12 and which extend through a pair of parallel slots 30 formed in the lower portion 25 of the member 13. The slots 30 extend longitudinally of the furcations 27 and at one end thereof said slots are enlarged at 31 in order that the enlarged heads of the studs 29 may be inserted therethrough.

The members 12 and 13 are clamped securely together and also held in alignment with each other through the medium of a clamping block 32 which is shouldered at 33 in order that said block may project between the furcations 27 and the length of the shouldered portion of said block 32 corresponds with the distance between the opposite adjacent edges of the furcations 27, see Fig. 4, and said block therefore acts to always hold the members 12 and 13 in alignment with each other. A clamping screw 34 is rigidly fastened at one end thereof to the portion 18 of the member 12 and said screw projects through the clamping block 32 and has a clamp nut 35 mounted thereon, and when said nut 35 is tightened against the clamp block 32, the portions 18 and 25 of the members 12 and 13 respectively are forced tightly together and prevented from moving relatively to each other.

The general operation of the device hereinbefore specifically described is as follows:—When it is desired to insert the piston 8, with the piston rings 9 mounted therein, within the cylinder 5, the members 12 and 13 which have previously been separated one from the other, are placed upon opposite sides of the piston and the lower portions 18 and 25 thereof interlocked one with the other upon opposite sides of the connecting rod 11 and said members 12 and 13 are then forced together and the upper curved portions 15 and 22 thereof are forced into engagement with the periphery of the piston rings 9, and after said piston rings, which previously have been projecting slightly beyond the periphery of the piston 8 have been compressed entirely within the grooves 10 in said piston, the members 12 and 13 are securely clamped together through the medium of the clamping block 32, screw 34 and nut 35.

The piston 8 with the compressor thereon, is then placed beneath the cylinder 5 with the bevelled extremities of the furcations 17 and 24 projecting slightly into the bore of the cylinder and said bevelled extremities of said furcations will engage the bevelled portion 7 at the lower extremity of the bore 6 of the cylinder 5 and thereby aid in aligning said piston 8 with the bore of said cylinder. The piston 8 is then forced upwardly, the curved portions 15 and 22 of the members 12 and 13 respectively holding the piston rings 9 entirely within their grooves 10 until said piston and its rings have been forced entirely into the bore 6 of said cylinder.

The construction of the members 12 and 13 is such that there is sufficient resiliency in the upper curved portions 15 and 22 thereof to enable the piston 8 to be readily forced upwardly into the cylinder from between said curved portions, and the latter engage the piston rings 9 with sufficient pressure to hold said piston rings entirely within their respective grooves until they have passed into the cylinder when they will spring outwardly and engage said cylinder.

It will be noted that after the compressor of this invention has been positioned upon a piston, that a large portion of the periphery of said piston and piston rings is still visible, and it is possible for the user of the device to locate the split ends of the piston rings in their proper positions within their respective grooves and then insert the piston within the cylinder without changing the relative positions of said split ends of said piston rings and the user of the device can, therefore, be assured that after the piston is in position within its cylinder, that the split ends of the piston rings will be located in the same relative positions that they were before he started to insert the piston in the cylinder.

It will be distinctly understood that while the piston ring compressor of this invention is particularly designed and adapted for use in connection with the pistons and cylinders of internal combustion engines, that said compressor may also be employed in a similar capacity in connection with any form of piston which employs piston rings, irrespective of the character of the device in which said piston is employed.

I claim:

1. A piston ring compressor comprising, in combination, a pair of parallel members provided with oppositely disposed curved portions spaced apart and adapted to embrace a piston and confine the piston rings thereof within their respective grooves, means to hold said members in sliding interlocking engagement one with the other and means to clamp said members together.

2. A piston ring compressor comprising, in combination, a pair of parallel members provided with oppositely disposed resilient curved portions spaced apart and having bifurcated upper extremities and adapted to embrace a piston and confine the piston rings thereof within their respective grooves, the lower portion of said members being bent and having sliding interlocking engagement one with the other and means to clamp said members together.

3. A piston ring compressor comprising, in combination, a pair of parallel members provided with oppositely disposed resilient curved portions spaced apart and having bifurcated upper extremities and adapted to embrace a piston and confine the piston rings thereof within their respective grooves, a portion of each of said members being bent at an angle to the piston embracing portion thereof and having sliding engagement one with the other, means to interlock said members one with the other and means to clamp said members together.

4. A piston ring compressor comprising, in combination, a pair of parallel members provided with oppositely disposed resilient curved portions spaced apart and having bifurcated upper extremities and adapted to embrace a piston and confine the piston rings thereof within their respective grooves, a portion of each of said members being bent toward each other and being provided with oppositely extending bifurcated portions having sliding engagement one with the other, means to interlock said members one with the other and means to clamp said members together.

5. A piston ring compressor comprising, in combination, a pair of parallel members provided with oppositely disposed resilient curved portions spaced apart and having bifurcated upper extremities and adapted to embrace a piston and confine the piston rings thereof within their respective grooves, a portion of each of said members being bent toward each other and at right angles to the piston embracing portion thereof and being provided with oppositely extending bifurcated portions having sliding engagement one with the other, means to interlock said members one with the other, means to position said members in alignment one with the other and means to clamp said members together.

6. A piston ring compressor comprising, in combination, a pair of parallel members provided with oppositely disposed resilient curved portions having bifurcated upper extremities and adapted to embrace a piston and confine the piston rings thereof within their respective grooves, a portion of said members being bent toward each other and being provided with oppositely extending bifurcated portions having sliding engagement one with the other, studs fast to one of said members and detachably secured to the other of said members, a block adapted to position said members in alignment one with the other and means to clamp said members together.

In testimony whereof I have hereunto set my hand.

CHARLES R. GILLIS.